United States Patent
Finger-Albert et al.

(10) Patent No.: US 12,388,306 B2
(45) Date of Patent: Aug. 12, 2025

(54) ROTOR FOR A ROTARY ELECTRIC MACHINE HAVING A BARRIER PROTECTING COIL ENDS OF THE ROTOR

(71) Applicant: Valeo eAutomotive Germany GmbH, Erlangen (DE)

(72) Inventors: Christian Finger-Albert, Erlangen (DE); Carsten Siepker, Erlangen (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 230 days.

(21) Appl. No.: 18/145,523

(22) Filed: Dec. 22, 2022

(65) Prior Publication Data

US 2023/0208221 A1 Jun. 29, 2023

(30) Foreign Application Priority Data

Dec. 23, 2021 (EP) .................................. 21217474
Jan. 27, 2022 (EP) .................................. 22153701

(51) Int. Cl.
*H02K 1/24* (2006.01)
*H02K 1/28* (2006.01)
*B60K 1/00* (2006.01)

(52) U.S. Cl.
CPC ................. *H02K 1/24* (2013.01); *H02K 1/28* (2013.01); *B60K 1/00* (2013.01)

(58) Field of Classification Search
CPC .. H02K 1/24; H02K 1/28; H02K 3/51; H02K 1/26; H02K 3/38; H02K 3/527; H02K 2203/12; B60K 1/00; B60Y 2200/90; Y02T 10/62; Y02T 10/64
See application file for complete search history.

(56) References Cited

U.S. PATENT DOCUMENTS

| 3,353,041 A | * | 11/1967 | Little | H02K 3/51 |
| | | | | 310/43 |
| 2016/0141924 A1 | * | 5/2016 | Park | H02K 1/24 |
| | | | | 310/216.073 |
| 2016/0164374 A1 | * | 6/2016 | Yang | H02K 3/527 |
| | | | | 310/59 |
| 2018/0109170 A1 | * | 4/2018 | Park | H02P 29/00 |

* cited by examiner

*Primary Examiner* — Thomas Truong
(74) *Attorney, Agent, or Firm* — Oblon, McClelland, Maier & Neustadt, L.L.P.

(57) ABSTRACT

A rotor for a rotary electric machine, capable of rotating around an axis of rotation, the rotor has first and second axial ends and includes a rotor body having a plurality of teeth circumferentially distributed around the axis and projecting radially, each tooth being in contact with two end plates. Also included is a rotor winding having a plurality of coils, each coil being wound on one of said teeth of the rotor body, each coil having two coil ends, two covers, a first cover located on the first axial end of the rotor and a second cover located on the second axial end of the rotor. The rotor has at least one non-conductive radial barrier that maintains a predetermined distance between the first coil end and the first cover on the one hand and between the second coil end and the second cover on the other hand.

11 Claims, 4 Drawing Sheets

ROTOR FOR A ROTARY ELECTRIC MACHINE HAVING A BARRIER PROTECTING COIL ENDS OF THE ROTOR

FIELD OF THE INVENTION

The present invention belongs to the field of rotary electric machines configured to be on board of an automotive vehicle, such as an electric vehicle (EV) or a hybrid vehicle (HV).

The present invention relates in particular to the field of separately excited rotors, also called wound rotors or slip ring rotors, integrated to rotary electric machines.

BACKGROUND OF THE INVENTION

As is known, an electric or a hybrid automotive vehicle presents an electric drive comprising a rotary electric machine which needs to be supplied with electric power, for instance by a high voltage power supply battery, to deliver a mechanical power in order to ensure propulsion of the vehicle.

In a general manner, the rotary electric machine comprises a stator, referring to a fixed part of the rotary electric machine, and a rotor, referring to a rotating part of the rotary electric machine. The rotor then comprises a rotor shaft configured to ensure the transmission of the mechanical power between the rotary electric machine and an exterior driven apparatus, notably the wheels of the vehicle.

In particular, it is known to have the rotor separately excited using a rotor winding. This type of rotors is commonly referred as wound rotors or slip ring rotors. Such a rotor comprises a rotor body formed of a stack of laminations and has a plurality of teeth projecting radially. Then, the field coil is configured to be wound around each of the plurality of teeth.

During operation, high centrifugal forces, which can pull the rotor winding out in the radial direction, occur. The centrifugal forces are dependent on the rotational speed and on the weight of the rotor components. For safety purposes, in high power supplied conditions, the distance between the rotor winding and other rotor conductive parts has to be taken into consideration.

It already exists, various techniques to prevent rotor winding movement; potting material filling the rotor interior volume; groove stoppers or groove wedges preventing the rotor winding to drop out. Such groove wedges are known, for example, from document DE 28 17 951 A1.

In many applications, it would be acceptable to use only these bonding materials to respect a creepage distance between the rotor winding and rotor conductive parts.

However, under high centrifugal forces and under large temperature variations, bonding materials do not have the necessary mechanical properties to withstand high centrifugal forces. Bonding materials may show some cracks. These cracks are risky and could lead to distance reduction between the rotor windings and other conductive parts.

For safety reason, there is a need to maintain a distance always bigger than a creepage distance between the rotor winding and rotor conductive parts durably, in every thermal condition and under high centrifugal forces.

The objective of the invention is to permit rotor safe use.

For this purpose, the invention concerns a rotor for a rotary electric machine, capable of rotating around an axis of rotation, the rotor having two axial ends, a first axial end and a second axial end.

The rotor comprises:
- a rotor body comprising a plurality of teeth circumferentially distributed around the axis and projecting radially, each tooth being in contact with two end plates, a first end plate and a second end plate, the first end plate being located on the first axial end of the rotor and the second end plate being located on the second axial end of the rotor,
- a rotor winding comprising a plurality of coils, each coil being wound on one of said teeth of the rotor body, each coil having two coils ends, a first coil end located on the first axial end of the rotor and a second coil end located on the second axial end of the rotor, and
- two covers, a first cover located on the first axial end of the rotor and a second cover located on the second axial end of the rotor, said first cover and said second cover protect said first rotor axial end and said second rotor axial end.

Moreover, the rotor has at least one non-conductive radial barrier that maintains a predetermined distance between said coil ends and said covers.

This barrier between the coil ends and the covers prevents contact and distance reduction between them, notably when high rotational speeds occur.

Advantageously, the barrier extends over the entire circumference of the rotor.

Advantageously, the rotor has two non-conductive radial barriers, a first barrier that maintain a predetermined distance between the first coil end and the first cover and a second radial barrier on the one hand and between the second coil end and the second cover on the other hand.

Advantageously, the rotor body is formed of a stack of laminations.

According to one embodiment, the rotor has an interior space. The interior space can be filled with potting material. The potting material makes it possible to maintain the various elements of the rotor in position. The potting material promotes thermal conduction to evacuate calories.

According to one embodiment, the barrier is a solid part. The additional barrier is made of electrically insulating material, for example in plastic. With a barrier as a solid part, risks of breakage due to the rotation and aging are less important than with potting material forming alone the barrier between said coil ends and said covers. In the patent application wording, potting material are not a solid part.

According to one embodiment, the two covers delimit axially the interior space.

According to one embodiment, the covers have axial openings. Said axial openings are used for the passage of the potting material once the rotor is assembled and/or for an air extraction tool implement during the process of filling.

According to one embodiment, the two end plates are topped with a plurality of caps. Each cap can cover at least radially and partially one of the first coil end and second coil end.

According to one embodiment, the caps are integral with one of said two end plates. In a variant, the end plates and the caps are different parts fixed together.

Advantageously, the caps are made of electrically insulating material, for example in plastic.

Advantageously, the coil ends do not project axially over the caps.

Advantageously, the caps present ribs to improve heat transfer from the end coils. The ribs can be straight. The ribs can be axial. The ribs can be circumferential.

According to one embodiment, the radial barrier comprises the caps. In this configuration, the caps are shaped in such a way that the caps radially cover all the coil ends.

According to one embodiment, the caps are contiguous circumferentially.

According to one embodiment, the rotor comprises inter-teeth spaces in which the coils are arranged, each inter-teeth space comprises also a lock ledge that cooperates with complementary shapes formed in the two adjacent teeth.

According to one embodiment, the lock ledges are axially in the rotor body space. The lock ledges and the rotor body can have the same axial length.

According to one embodiment, the radial barrier comprises the lock ledges. In this configuration, the lock ledges are longer than the rotor body. The lock ledges are shaped in such a way that they are radially disposed circumferentially between the caps.

According to one embodiment, an insulation element, for instance an insulation paper, is provided between the teeth and the coils.

According to one embodiment, the inter-teeth spaces are part of the interior space. The inter-teeth spaces is filled with the potting material. The lock ledges delimit radially the interior space.

According to one embodiment, the rotor comprises two interposition parts: a first interposition part arranged on the rotor first axial end and a second interposition part arranged on the rotor second axial end. The radial barrier comprises said two interposition parts.

According to one embodiment, each interposition part is fixed on the corresponding cover.

Advantageously, the interposition parts are made of electrically insulating material, for example in plastic.

Advantageously, the coil ends do not project axially over the interposition parts.

Advantageously, each interposition part is monolithic. They are not built with several parts fixed together. The interposition parts are distinct from the end plates, from the covers, from the caps.

According to one embodiment, each interposition part comprises an axial portion that partially covers the caps. The axial portion extends in the axial direction.

Advantageously, each interposition part radially overlays the caps, notably circumferential ends of each caps.

The overlapping of the interposition parts on the caps permits to access to a safe assembly in term of creepage distance.

According to one embodiment, the axial portion has windows facing the caps. each cap describes a central portion between its two circumferential ends facing one window of the corresponding interposition part axial portion. The cap ribs can be located on the central portion.

The windows and the ribs allow coil heat dissipation in the radial direction.

Advantageously, there is a window for each cap.

According to one embodiment, each interposition portion has a transverse portion. The transverse portion extends in the radial direction.

Advantageously, the transverse portion has openings facing the coil ends. These openings allow coil heat dissipation in the axial direction.

Advantageously, there is an opening in front of each coil end.

According to one embodiment, each cover has reinforcing arms. Each interposition part has projections that come circumferentially between the coil ends, the reinforcing arms cooperate with the projections, notably to fix the interposition part on the corresponding cover.

According to one embodiment, the radial barrier comprises the caps and the interposition part, specifically the axial portions of the interposition part.

In the rotor according to the invention, the radial barrier maintains a predetermined distance between the first coil end and the first cover on the one hand and between the second coil end and the second cover on the other hand. Specifically, in other words, said barrier radially covers the coil ends.

A further aspect of the invention is an assembly comprising the rotor as described previously and a rotor shaft on which the rotor is mounted on.

Advantageously, the two covers are also mounted on the rotor shaft.

Advantageously, the rotor, in particular the rotor body, is press-fitted on the rotor shaft. Alternatively, the rotor body can be mounted on the rotor shaft with a loose fit.

A further aspect of the invention is a rotary electrical machine comprising an assembly as described previously and a stator surrounding the assembly.

Another aspect of the invention is the electric drive, comprising the rotary electric machine and an inverter configured to convert a direct current voltage coming from a high-voltage power supply battery into an alternating current voltage so as to drive the rotary electric machine. The AC voltage may be a multiphase AC voltage, especially a three-phase voltage.

A further aspect of the invention is an electric of a hybrid vehicle, comprising the electric drive for driving the vehicle. The vehicle may comprise the high-voltage power supply battery, preferably a rechargeable battery for providing the DC voltage to the inverter, if applicable.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

The invention will be better understood on reading the description that follows, and by referring to the appended drawings given as non-limiting examples, in which identical references are given to similar objects and in which.

DETAILED DESCRIPTION

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 6:
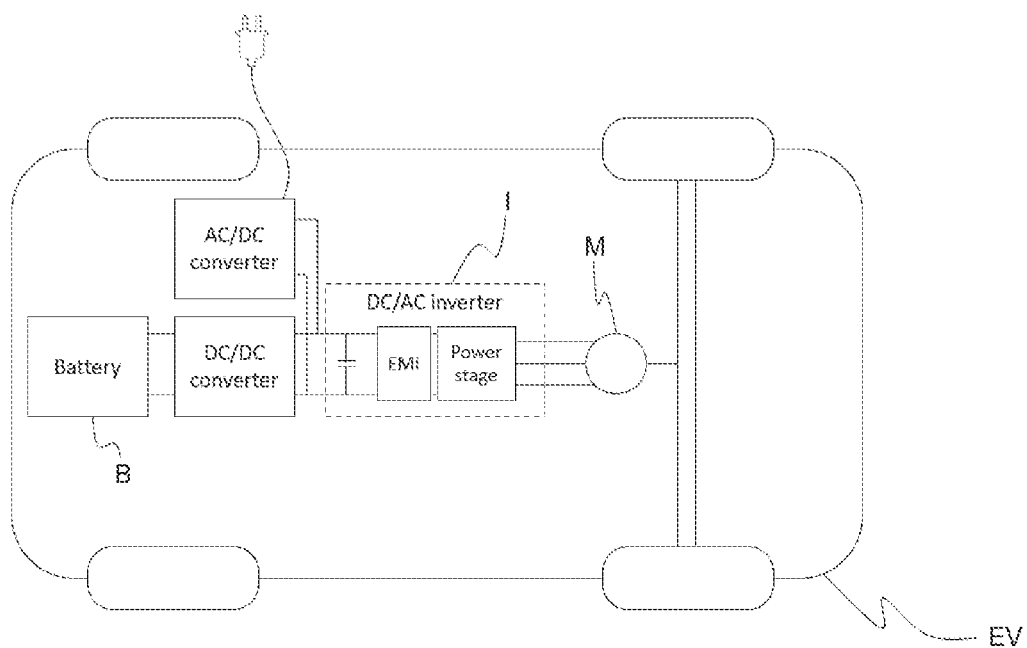
FIG. 6 is a schematic diagram of an automotive electric or hybrid vehicle comprising the rotary electric machine according to an embodiment of the invention.

In reference to FIG. 6, an aspect of the invention is an electric vehicle or a hybrid electric automotive vehicle EV comprising wheels and an electric drive configured to drive at least indirectly at least one of the wheels of the vehicle. The vehicle may comprise a high-voltage power supply battery B, preferably a rechargeable battery, for providing electric power to the electric drive.

In the examples described, the electric drive comprising a rotary electric machine M and an inverter I configured to convert a direct current (DC) voltage coming from the high-voltage power supply battery B into an alternating current (AC) voltage in order to drive the rotary electric machine M. The rotary electric machine M may in particular be a three-phase rotary electric machine supplied with a three-phase AC voltage.

In the examples described, the rotary electric machine comprising a stator, referring to the fixed part of the rotary electric machine, and an assembly 10 comprising a rotor 1 mounted on a rotor shaft 4, referring to the rotating part of the rotary electric machine. The assembly is configured to rotate around an axis X of rotation. In particular, the stator presents an annular shape and surrounds coaxially the rotor. Generally, the rotary electric machine comprises a casing covering the stator and the rotor 1. Ordinarily, the stator comprises a stator body formed of a stack of laminations having a plurality of stator teeth projecting radially, and stator windings wound around the stator teeth.

Figure 1:
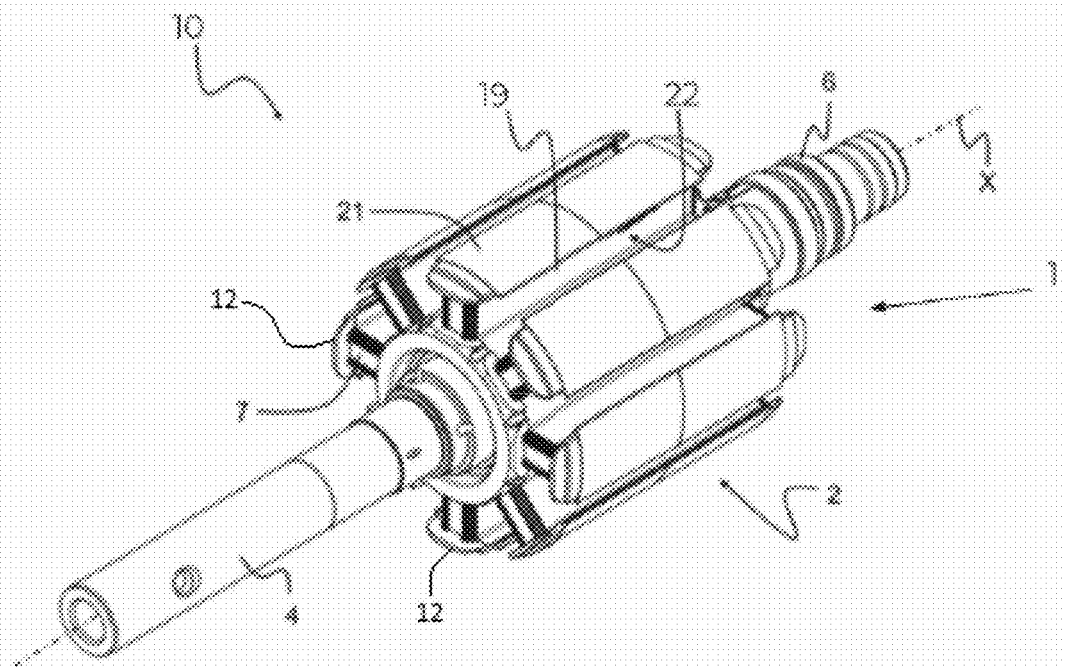
FIG. 1 is a schematic diagram of a view of an example of an assembly according to an embodiment of the invention.
Figure 2:
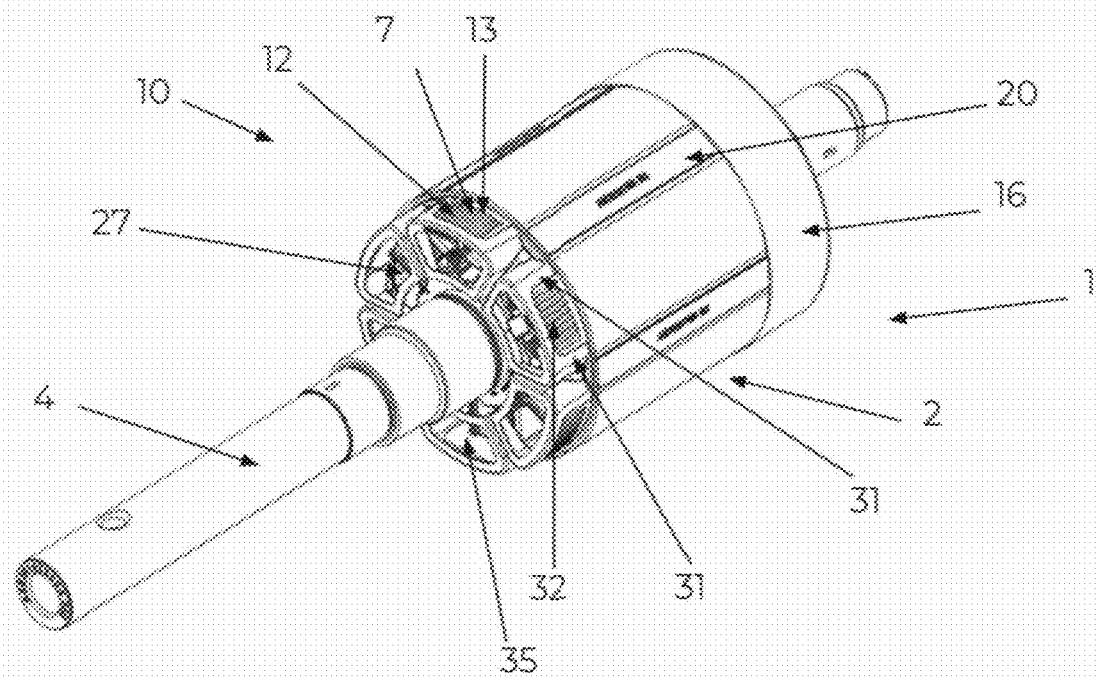
FIG. 2 is a schematic diagram of a view of a second example of an assembly according to an embodiment of the invention.

FIG. 1 and FIG. 2 disclose views of example of the assembly 10 according to a further aspect of the invention.

The rotor 1 is, in particular, a separately excited rotor, also commonly referred as a wound rotor or a slip ring rotor. In this type of rotor, the rotor 1 comprises a rotor winding 9 connected to an external power supply through slip rings 6. The slip rings 6 correspond to electro-mechanical devices configured to allow the exchange of electric power between a rotating element and a fixed element, here respectively the field coil and the external power supply. The rotor 1 has two axial ends, a first axial end and a second axial end. The slip rings 6 located on the first end of the rotor are mounted on the rotor shaft 4.

The rotor 1 comprises also a rotor body 2 formed of a stack of laminations and being configured to be mounted coaxially on the rotor shaft 4. More precisely, the rotor body 2 is press-fitted on the rotor shaft 4. The press-fitting of the rotor body 2 on the rotor shaft 4 relies on having an outer circumference of the rotor shaft 4 slightly higher than an inner circumference of the rotor body 2, before proceeding with the press-fitting.

The rotor body 2 comprises a plurality of teeth 21 circumferentially distributed around the axis and projecting radially. The plurality of teeth 21 may notably comprise four, six, or eight teeth.

The rotor winding 9 comprises a plurality of coils 3. Each coil having two coils ends, a first coil end located on the first axial end of the rotor and a second coil end located on the second axial end of the rotor 1. The two coil ends 5 projecting axially from respectively two axial ends of the rotor 1.

The rotor 1 further comprises two end plates 7, as represented in FIGS. 1 and 2, a first end plate and a second end plate. The first end plate is located on the first axial end of the rotor 1 and the second end plate 7 is located on the second axial end of the rotor 1. Each tooth 21 is in contact with the two end plates 7. The two end plates 7 are especially located between the rotor body 2 and the coil ends 5 such that to electrically insulate the field coil from the rotor body 2.

In the examples described, each end plate of the two end plates 7 is topped with a plurality of caps 12. There is one cap 12 for one tooth 21 on each side of the rotor 1. Each cap 12 covers at least radially and partially one of the first coil end 21 and second coil end 21. Each cap 12 is integral with one of said two end plates 7 and they are made of electrically insulating material, for example in plastic.

In the example described, the caps 12 present ribs 13 to improve heat transfer from the end coils 5. The ribs 13 are straight in the axial direction.

In the examples described, the rotor 1 comprises also two covers 16, a first cover located on the first axial end of the rotor 1 and a second cover located on the second axial end of the rotor 1. The covers 16 are made of aluminum.

The two covers 16 are mounted on the rotor shaft 4 and configured to cover the coil ends 12. Each cover 16 has a mounting opening receiving a portion of the rotor shaft 4 so that the cover 16 and the portion of the rotor shaft 4 exert reciprocal radial force on each other to ensure the fixation.

Figure 3:
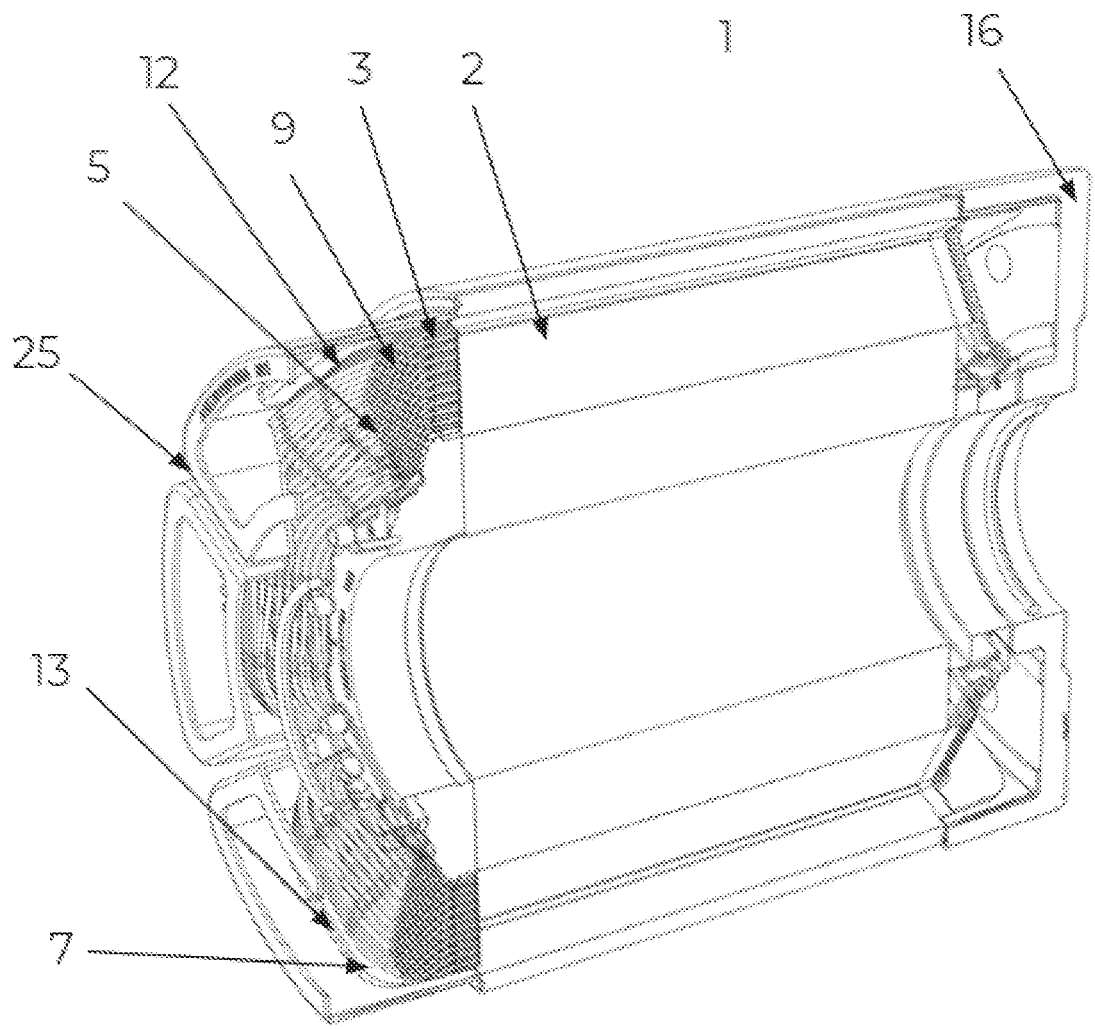
FIG. 3 is a schematic diagram of a partial cut view of the rotor of FIG. 2.

Only the first cover 16 is visible on FIGS. 2 and 3. The second cover is similar to the one shown on FIGS. 2 and 3.

In the examples described, the rotor 1 comprises also inter-teeth spaces 19 in which the coils 3 are arranged. An inter-tooth space 19 corresponds to the space between two adjacent teeth 21. Each inter-tooth space 19 comprises also a lock ledge 20 that cooperates with complementary shapes formed in the two adjacent teeth 21. The lock ledges 20 and the rotor body 2 have the same axial length.

Each coil 3 is then wounded around on one tooth 21 of said teeth and around the two end plates 7. Each field coil 3 passes through inter-teeth spaces 19 and an insulation paper is provided between a lateral face 22 of the tooth and the field coil 3, as illustrated in FIG. 3.

In the examples described, the rotor 1 has an interior space. The two covers 16 delimit axially the interior space. The lock ledges 20 delimit radially this interior space and the inter-teeth spaces 19 are part of said interior space. The lock ledges 20 and the two end covers 7 are configured to be sealed with the rotor body 2. The interior space is filled with potting material, for instance a resin, such that to fix the coils 3.

Figure 4:
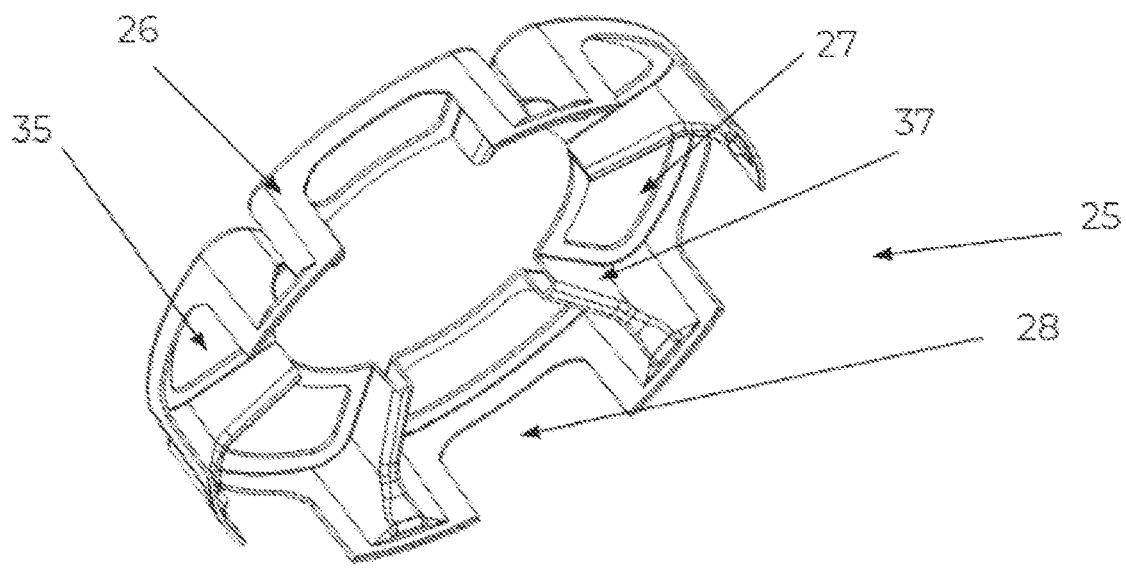
FIG. 4 is a schematic diagram of a view of the interposition part of FIG. 2.

In the examples described, notably in relation with FIGS. 2, 3 and 4, the rotor also comprises two interposition parts 25, a first interposition part arranged on the rotor first axial end and a second interposition part arranged on the rotor second axial end.

Each interposition part 25 forms a non-conductive radial barrier that maintains predetermined distance between the coil ends 5 and the covers 16. These interposition parts 25 between the coil ends 5 and the covers 16 prevent contact and distance reduction between them, notably when high rotational speeds occur.

Each interposition part 25 is made of electrically insulating material, for example in plastic. Each interposition part 25 is monolithic. The interposition parts are distinct from the end plates 7, from the covers 16, from the caps 12.

Each interposition part 25 comprises an axial portion 26 and a transverse portion 27. The axial portion 26 extends in the axial direction and partially covers the caps 12. The transverse portion 27 extends in the radial direction. The transverse portion 27 is connected with the axial portion 26 at a radial end of the transverse portion.

This axial portion 26 of each interposition part 25 forms the radial barrier. The axial portion 26 of each interposition part radially overlays the two circumferential ends 31 of each caps 12.

The axial portion 26 of each interposition part 25 has windows 28 facing the caps 12. One window per cap 12. Each cap 12 describes a central portion 32 between its two circumferential ends 31 facing one window of the corresponding axial portion 26. The ribs 13 are located on the central portion 32. The windows 28 and the ribs 13 allow coils 3 heat dissipation in the radial direction. Each window is opened in direction of the rotor body 2.

On the entire circumference, the caps 12 and/or the axial portion 26 are radially between the covers 16 and the coil end 5.

Each transverse portion 27 has openings 35 facing the coil ends 5. There is an opening 35 in front of each coil end 31.

Figure 5:
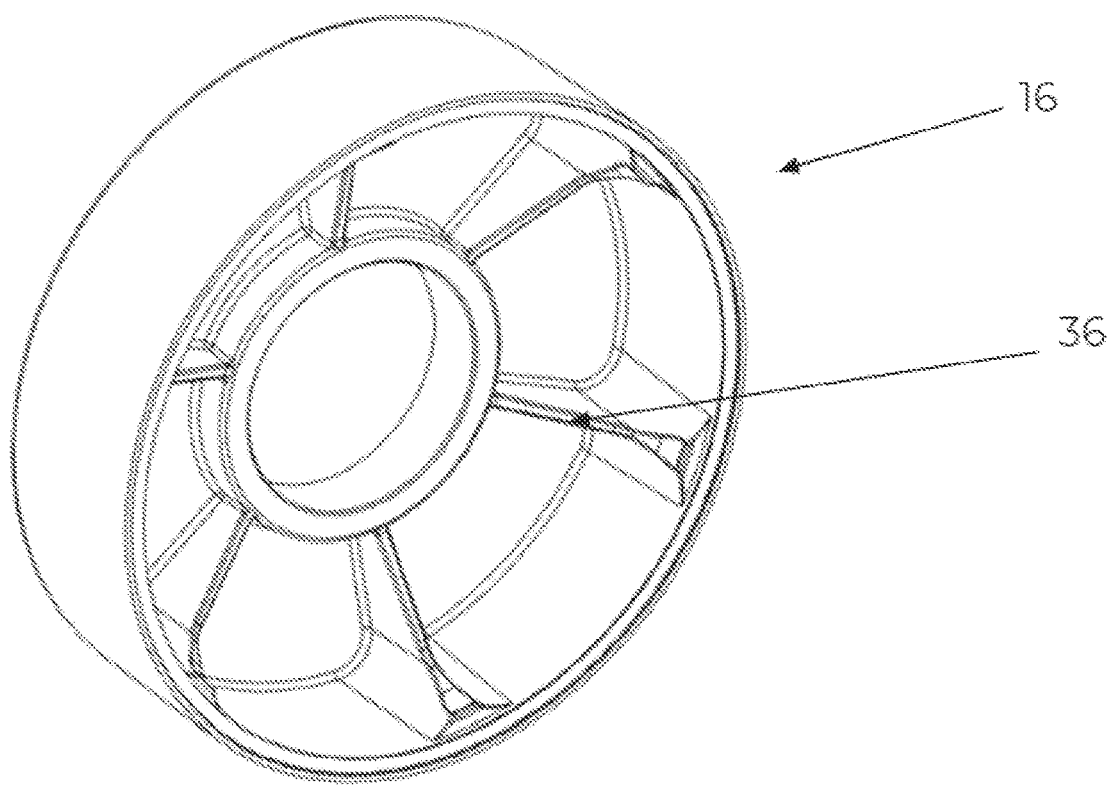
FIG. 5 is a schematic diagram of a view of the cover of FIG. 2.

In the examples described, notably in relation with FIG. 5, each cover 16 has reinforcing arms 36. Each interposition part 25 has projections 37 that come circumferentially between the coil ends 5. The reinforcing arms 36 cooperate with the projections 37 to fix the interposition part on the corresponding cover.

Although embodiments have been described with reference to a number of illustrative embodiments thereof, it should be understood that numerous other modifications and embodiments can be devised by those skilled in the art that will fall within the spirit and scope of the principles of this disclosure.

In the context of the invention, the wordings "radially covers", "radially overlays", or similar wording, mean that one element covers another element when seen along a radial direction of the rotor, specifically when seen from the outside of the rotor. For example, as visible on FIG. 3, the axial portion 26 of the interposition part 25 radially covers the coil end 5. For instance, as visible on the figures, the barrier comprises the caps 12 and the axial portion 26 of the interposition part 25. Said barrier is radially between the cover 16 and the coil end 5, specifically between a circumferential portion of the cover 16 which extends axially and the coil end 5.

In the context of the invention, "radial barrier" means that the barrier has a dimension crossing many radial directions of the rotor, in other words a dimension spanning over an angle of a section of the rotor perpendicular to the axis of the rotor.

In one embodiment according to the invention, the barrier is a solid part contrary to a barrier made of a potting material. In other words, the barrier is a solid part as such, which is already formed before being mounted, as an additional part, in the rotor. Whereas a barrier made of a potting material would have been formed by putting the potting material in its fluid phase inside the rotor, and afterwards hardening said potting material. For instance, the figures show such a radial barrier 12, 26 being a solid part.

According to one embodiment of the invention, each cover has reinforcing arms. Each interposition part has projections 37 that come circumferentially between the coil ends 5. In other words, the projection 37 comes between two coil ends 5 along a circumference of said coil ends 5, as illustrated in the figures for example.

The invention claimed is:

1. Rotor for a rotary electric machine, capable of rotating around an axis of rotation, the rotor having two axial ends, a first axial end and a second axial end, the rotor comprising:

a rotor body comprising a plurality of teeth circumferentially distributed around the axis and projecting radially, each tooth being in contact with two end plates, a first end plate and a second end plate, the first end plate being located on the first axial end of the rotor and the second end plate being located on the second axial end of the rotor, a rotor winding comprising a plurality of coils, each coil being wound on one of said teeth of the rotor body, each coil having two coil ends, a first coil end located on the first axial end of the rotor and a second coil end located on the second axial end of the rotor, and two covers, a first cover located on the first axial end of the rotor and a second cover located on the second axial end of the rotor, said first cover and said second cover protect said first rotor axial end and said second rotor axial end, wherein the rotor has at least one non-conductive radial barrier that maintains a predetermined distance between the first coil end and the first cover on the one hand and between the second coil end and the second cover on the other hand, wherein the two end plates are topped with a plurality of caps, each cap covering at least radially and partially one of the first coil end and second coil end, wherein the rotor further comprising two interposition parts, a first interposition part arranged on the rotor first axial end and a second interposition part arranged on the rotor second axial end, each interposition part is fixed on the corresponding cover, the radial barrier comprising said two interposition parts, and wherein each interposition part comprising an axial portion that partially covers the caps.

2. Rotor according to claim 1, the rotor having an interior space filled with potting material.

3. Rotor according to claim 2, the rotor comprising inter-teeth spaces in which the coils are arranged, each inter-teeth space comprises also a lock ledge that cooperates with complementary shapes formed in the two adjacent teeth.

4. Assembly comprising a rotor according to claim 2 and a rotor shaft on which the rotor is mounted on.

5. Rotor according to claim 1, the rotor comprising inter-teeth spaces in which the coils are arranged, each inter-teeth space comprises also a lock ledge that cooperates with complementary shapes formed in the two adjacent teeth.

6. Assembly comprising a rotor according to claim 5 and a rotor shaft on which the rotor is mounted on.

7. Rotor according to claim 1, wherein the axial portion has windows facing the caps.

8. Rotor according to claim 1, each interposition portion having a transverse portion, the transverse portion having openings facing the coil ends.

9. Rotor according to claim 8, each cover having reinforcing arms and each interposition part having projections that come circumferentially between the coil ends.

10. Assembly comprising a rotor according to claim 1 and a rotor shaft on which the rotor is mounted on.

11. Rotary electrical machine comprising an assembly according to claim 10 and a stator surrounding the assembly.

* * * * *